United States Patent
Lonka et al.

(10) Patent No.: US 9,338,694 B2
(45) Date of Patent: May 10, 2016

(54) WIRELESS COMMUNICATION SYSTEM WITH SIPTO CONTINUITY

(71) Applicants: Srinivas Reddy Lonka, Hyderabad (IN); Srinivasa Rao Addepalli, San Jose, CA (US); Naga Veera Venkata Raghava Rao Gunturu, Hyderabad (IN)

(72) Inventors: Srinivas Reddy Lonka, Hyderabad (IN); Srinivasa Rao Addepalli, San Jose, CA (US); Naga Veera Venkata Raghava Rao Gunturu, Hyderabad (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 37 days.

(21) Appl. No.: 14/306,202

(22) Filed: Jun. 16, 2014

(65) Prior Publication Data

US 2015/0365845 A1 Dec. 17, 2015

(51) Int. Cl.
*H04L 12/26* (2006.01)
*H04W 28/12* (2009.01)
*H04W 36/22* (2009.01)

(52) U.S. Cl.
CPC .............. *H04W 28/12* (2013.01); *H04W 36/22* (2013.01)

(58) Field of Classification Search
None
See application file for complete search history.

(56) References Cited

U.S. PATENT DOCUMENTS

| | | | |
|---|---|---|---|
| 8,254,334 B2 | 8/2012 | Chu et al. | |
| 2011/0261723 A1* | 10/2011 | Yamato | H04L 45/34 370/255 |
| 2012/0026933 A1* | 2/2012 | Aso | H04L 12/5692 370/315 |
| 2012/0039304 A1* | 2/2012 | Kim | H04W 28/08 370/332 |
| 2012/0076121 A1 | 3/2012 | Choi | |
| 2012/0113989 A1* | 5/2012 | Akiyoshi | H04L 45/02 370/392 |
| 2013/0003698 A1 | 1/2013 | Olvera-Hernandez | |
| 2013/0003699 A1 | 1/2013 | Liu | |
| 2013/0088967 A1* | 4/2013 | Kusumoto | H04L 47/11 370/235 |
| 2013/0089076 A1 | 4/2013 | Olvera-Hernandez | |
| 2013/0176888 A1* | 7/2013 | Kubota | H04L 45/38 370/252 |
| 2013/0272135 A1* | 10/2013 | Leong | H04L 41/0823 370/241 |
| 2014/0204746 A1* | 7/2014 | Sun | H04W 28/0247 370/235 |
| 2014/0247725 A1* | 9/2014 | Torigoe | H04L 12/2874 370/235 |
| 2014/0254373 A1* | 9/2014 | Varma | H04W 40/36 370/235 |
| 2014/0269535 A1* | 9/2014 | Pazhyannur | H04W 40/24 370/329 |

* cited by examiner

*Primary Examiner* — Otis L Thompson, Jr.
(74) *Attorney, Agent, or Firm* — Charles E. Bergere

(57) ABSTRACT

A communication system network element includes a Local Gateway co-located with a Home eNodeB. The Local Gateway has an open flow switch and a flow table, and provides service continuity of active SIPTO (selective IP traffic offload) sessions using open flow/software defined networking. An operator-controlled Open flow controller manages sessions at the Local Gateway. A flow modification feature is used to modify an existing flow in the flow table, which provides a means for interception and handover from a source Home eNodeB to a target Home eNodeB.

9 Claims, 2 Drawing Sheets

WIRELESS COMMUNICATION SYSTEM WITH SIPTO CONTINUITY

BACKGROUND OF THE INVENTION

The present invention relates generally to wireless communication systems and, more particularly, to systems that provide continuity for SIPTO (Selective Internet Protocol Traffic Offload).

Wireless communication systems, such as the $3^{rd}$ Generation system (3G) are well known. 3G has generally been developed to support macro-cell mobile phone communications. Such macro-cells use high power base stations (referred to as NodeBs) to communicate with wireless communication units or 'user equipments' (UE) within a relatively large geographical coverage area. Typically, a UE communicates with a Core Network (CN) of the 3G system via a Radio Network Subsystem (RNS). A wireless communication system typically has many RNS, each having one or more cells to which UEs may attach, and thereby connect to the network. UEs are also capable of relocating from one cell's coverage area to that of another, neighbouring cell in a process known as hand-over. Relocation may be initiated because the user of the UE moves out of a source cell coverage area and into a target, neighbour cell's area. Alternatively, the UE may relocate to another cell in order to access a service that is not available in its current cell.

Communications systems and networks are developing towards a broadband and mobile system. The 3G Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An evolved packet system (EPS) network provides only packet switching (PS) domain data access so a voice service may be provided by a 3G Radio Access Network (RAN) and circuit switched (CS) domain network. UEs can access the EPC through the E-UTRAN. Generally, the EPC is responsible for switching and routing data to and from the Internet. Lower power (and therefore smaller coverage area) cells are a recent development within the field of wireless cellular communication systems. Such small cells are effectively communication coverage areas supported by low power base stations. A low power base station that supports a small cell is often referred to as a Home Node B (HNB) in 3G parlance or an Evolved Home Node B (HeNB) in LTE parlance. These small cells are intended to augment the wide area macro network and support communications to UEs in a restricted, for example, indoor environment. An additional benefit of small cells is that they can offload traffic from the macro network, thereby freeing up valuable macro network resources. Thus a HeNB may provide users with access to LTE services over small service areas, such as homes or small offices. The HeNB may be intended to connect to an operators' core network by using, for example, public Internet connections. This may be particularly useful in areas where LTE may not have been deployed and/or legacy 3GPP radio access technology (RAT) coverage may already exist. This may also be useful in areas where LTE coverage may be faint or non-existent for radio transmission problems that occur, for example, while in an underground metro (subway) or a shopping mall.

LTE networks are becoming more and more congested. One known solution of reducing traffic in LTE networks is the use of the so-called Selective IP (Internet Protocol) Traffic Offload (SIPTO). SIPTO is a method of offloading traffic from a core network to a defined IP network. One known system includes a local gateway (L-GW) that may be located close to a HeNB and configured to perform IP traffic offload based on an IP address destination. IP traffic may then go through the L-GW to the Internet via the user's home network rather than through the Operator's Core Network. Local IP Access (LIPA) is a method for providing access for IP-capable UEs that are connected via an HeNB for example, to other IP capable entities in the same residential or enterprise IP network. Traffic for LIPA typically does not traverse the operator's network except for accessing particular information at the HeNB. These methods have their limitations. For example, SIPTO does not specify how lawful interception of traffic may be performed. Further, UE mobility, particularly maintenance of a session when roaming, is not specified. Therefore it would be advantageous to provide a system for reducing core network traffic without the limitations of the known systems.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
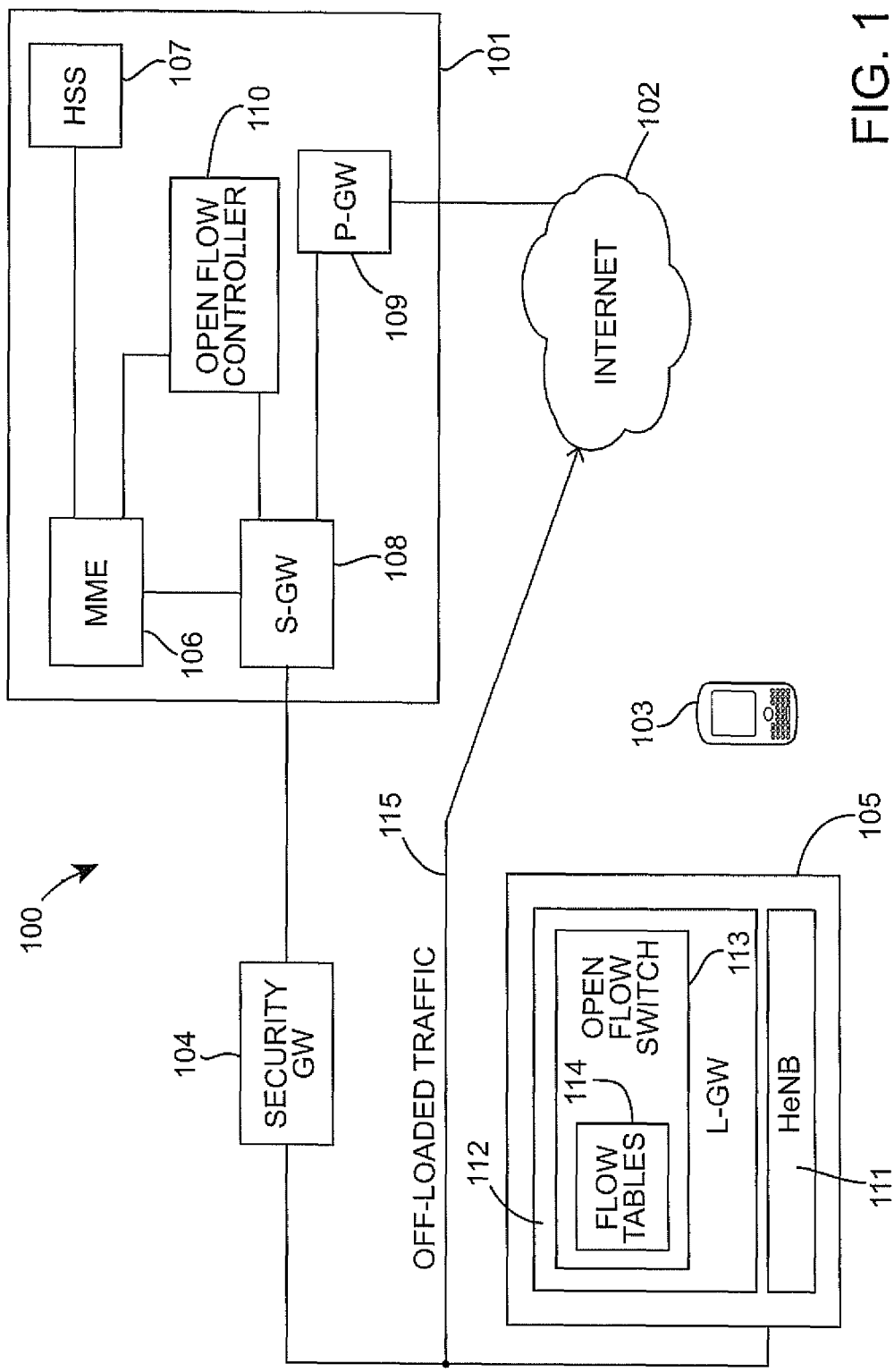
FIG. 1 is a simplified, schematic block diagram of a wireless communications system in accordance with a first embodiment of the invention.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a method for communicating data packets between network devices in a wireless communication system. The system includes an open flow controller and a network element. The network element includes an open flow switch having at least one flow table. The method comprises: at the network element, on receipt of a first packet from a wireless communication unit, sending said first packet to the open flow controller in a message which includes an identifier; at the open flow controller, returning the first packet to the network element and sending a modification message to the network element for creating a session in the flow table and for programming the open flow switch with rules for forwarding packets to either a core network or a local network, and at the network element, forwarding the first packet and subsequent packets from the wireless communication unit in accordance with the programmed rules. A flow table may have one or more flow entries. In one embodiment, the network element is a Home eNode B co-located with a Local Gateway.

In another embodiment, the present invention provides a method for handing over a communications session with a wireless communication unit from a first network element to a second network element in a wireless communication system, where the system includes an open flow controller. Each of the first and second network elements includes an open flow switch and an associated flow table. The method comprises sending from the open flow controller to each network element, flow modification messages for modifying associated flow tables for diverting downlink traffic received at the first network element and intended for the wireless communication unit to a tunnel existing between the first and second network elements and for diverting downlink traffic received by the second network element via the tunnel to the wireless communication unit. In one embodiment, each network element comprises a Home Node B collocated with a Local Gateway. In one example embodiment, the tunnel is a secure tunnel.

Preferably, two flow modification (FLOW MOD) messages are sent to each network element for each session, one for forward and one for reverse flow. In one example, the FLOW MOD messages also modify associated flow tables for diverting uplink traffic received from the wireless communication unit at the second network element to the tunnel and diverting uplink traffic received at the first network element via the tunnel to a previously configured interface.

In one example of the invention, a local gateway L-GW, co-located with a HeNB and with the support of an open flow data path, provides SIPTO granularity at session/flow level in order to achieve dynamic SIPTO by using open flow FLOW MOD create, modify and delete commands. In one embodiment, an Operator-controlled open flow controller is used to manage and control sessions at the L-GW. The invention supports interception using a flow modification feature to modify the existing flow in an open flow data path (or flow) table that uses groups concept to output to more than one port to achieve mirroring.

Advantageously, the invention supports a default dedicated tunnel between Local gateways, thereby avoiding scalability issues. A further advantage is that the invention can provide session continuity when moving from one Local Gateway to another Local Gateway in a handover process.

Referring now to FIG. 1, a wireless communications system 100 in accordance with an embodiment of the present invention is shown. A Core Network 101 routes traffic between the Internet 102 and a wireless communication unit (User Equipment) 103 via a security gateway (Security-GW) 104 and a network element 105. The Core Network 101 in this example is an Evolved Packet Core and includes a Mobility Management Enterprise (MME) 106, a Home Subscriber Server (HSS) 107, a Serving Gateway (S-GW) 108 and a Packet Gateway (P-GW) 109.

An open flow controller 110 is also provided and can communicate with the network element 105 via the S-GW 108 and Security-GW 104. The open flow controller 110 can also communicate with the MME 106. The open flow controller 110 operates in accordance with the known open flow protocol, which is a TCP/SSL based protocol between controllers and switches (or routers). Generally speaking, such a protocol gives access to the forwarding plane of a router over a network. The network element 105 includes the functionality of a node B and a local gateway. In this example, the network element 105 comprises a Home eNode B (HeNB) 111 co-located with a Local Gateway (L-GW) 112. The wireless communication unit (or UE) 103 communicates with the HeNB 111 over a radio interface. Therefore the UE 103 may be configured to transmit and/or receive wireless signals and may include, for example, a mobile station, a fixed or mobile subscriber unit, a pager, a cellular telephone, a personal digital assistant (PDA), a smartphone, a laptop, a netbook, a personal computer, a wireless sensor, consumer electronics, and the like.

The L-GW 112 is provided with an open flow switch 113 and an associated flow table 114. In some embodiments, several flow tables are provided. The open flow protocol allows the open flow controller 110 to connect to the open flow switch 113 in the L-GW 112 via a secure channel (or tunnel). The flow table 114 typically contains flows. A flow has a matching field that matches a flow in a data path. When an incoming packet is received, a lookup for a matching flow is made. If the packet matches a flow, the associated action defined in the flow is performed on the packet. A typical flow contains, for example, 5-tuple of a flow. Flow match structures enable the protocol to define criteria for matching to a particular flow. The L-GW 112 is configured, under certain conditions, to off-load traffic to the Internet 103 via a user's home network (on line 115) rather than allowing it to go through the Core Network 101, in a manner similar to the known SIPTO process. In one embodiment, the L-GW 112 is also capable of supporting LIPA.

The invention allows a network operator to control sessions in the L-GW 112 via the open flow controller 110 (for data plane) using open flow/software defined networking.

In an example of operation, on start-up, the open flow protocol establishes a session between the open flow controller 110 and the HeNB 111 via the open flow switch 113. The open flow controller 110 configures the pro-active flows in the switch 113 and associated flow table 112 on successfully establishing the connection. Once the open flow data path is initialized in the HeNB 111, data packets may be received. A first data packet of a session received from the UE 103 will not find a flow match in the flow table 114, i.e., there will be a table entry miss. As a result of this table entry miss, the L-GW 112 sends the first packet to the open flow controller 110 in a PACKET-IN message that includes the ERABID (EUTRAN Radio Access Bearer)/CorrelationID. On receiving the first packet, the open flow controller 110 processes the packet for the rules that match the CorellationID. For example, the flow is offloaded based on the rules that have been communicated and negotiated as part of NAS (Non-access stratum) and other procedures on the first packet. If the packet matches any of the rules, the controller 110 can use the CorrelationID for correlating downlink packets with the UE 103. The controller 110 sends a modification message (FLOW-MOD) to the L-GW 112 to create a session (or a flow) in a flow table. Also the controller 110 sends the first packet in a PACKET-OUT message back to the L-GW 112 for forwarding to its destination. Next, the controller 110 programs the switch 113 with the necessary instructions and actions so the switch 113 can send subsequent packets to either the Internet or forward them to Local Networks (LIPA) or forward them to the Core Network depending on the rules configured for the UE/ERABID/CorrelationID. Hence, all subsequent packets that belong to the same IP flow (from the same UE) will match the created flow in the flow table and be forwarded appropriately based on the flow information (or rules.)

Advantageously, a flow can be modified at any time in order to mirror the session to another local gateway or core network element for interception purposes. For example, every session that is created in L-GW 112 has an entry in the controller 110 (in a local session database, for example). When modifying the session for the purposes of interception, the group objects in the flow send each packet to multiple destinations and packets may be forwarded to the L-GW 112 to ensure session continuity and to the Core Network for mirroring purposes.

The MME 106 knows whether LIPA/SIPTO can be applied to the UE traffic and also is aware of the L-GW's IP address (sent in the Initial UE Context/Setup, ERABID/UE Context allocated UE IP, and other relevant information. The MME 106 configures the relevant information in the controller 110 as part of the setting up the rules. This information can also be used for mobility purposes. For example, the MME 106 informs the controller 110 of the UE S1 attach with PDP context, L-GW IP, ERABID/CorrelationID, TEIDs for LIPA and SIPTO. This will be the context for the controller 110 to match when managing subsequent sessions for that UE.

In some embodiments, the network element 105 is provided with the following capabilities: transference of the IP address of the HeNB 111 over S1-MME to the Core Network 101 at every idle-to-active transition; transference of the IP address of the HeNB 111 over S1-MME to the Core Network 101 within every Uplink NAS Transport procedure; support of the basic P-GW functions by the L-GW 112; buffering of packets subsequent to the first packet; internal direct L-GW-HeNB user plane management and in-sequence delivery of packets to the UE 103; support of the necessary S5 procedures; and transference of the "correlation id"

The UE 103 initiates a PDN (Packet Data Network) connectivity request in order to establish a PDN connection with the Core Network 101. A well-defined APN (Access Point Name) or a special LIPA indication is included to indicate the LIPA/SIPTO requirements. The S1-AP message that carries the PDN (Packet Data Network) connectivity request includes the following additional parameters: the L-GW IP address assigned during establishment of the IPSec tunnel(s) and the HeNB's capability (or otherwise) to support LIPA/SIPTO. The MME 106 then performs a LIPA/SIPTO authorisation of the UE to decide whether the UE is allowed to use LIPA/SIPTO functions or not according to the UE subscription data and the LIPA/SIPTO capability of the HeNB 111. The LIPA/SIPTO subscription data may be per APN, per CSG (Closed Subscriber Group) or both. The MME 106 rejects the PDN connectivity request if the LIPA/SIPTO authorisation fails. After a successful LIPA/SIPTO authorisation on the other hand, the MME 106 uses the L-GW address provided in the S1-AP signalling to select the L-GW 112 collocated with HeNB 111. It will be noted that if both LIPA and SIPTO are to be supported a separate connection should be used for this purpose.

Information related to default/table-miss behaviour or treatment of a packet that does not have a flow match is stored as a default/table-miss rule for a flow table in the switch 113. open flow datapath will be initialized as part of the HeNB initialisation. Once the datapath establishes a connection with the controller 110, all flow tables will be initialized with preconfigured flows (at the controller 110) that are meant for the connected open flow datapath.

The L-GW 112 acts as an Open flow switch for the traffic coming from the UE 103 as well as from the Internet 102. The L-GW 112 will typically have proprietary vendor extensions that help in applying the necessary instructions and actions for creating, modifying or deleting a flow that outputs on the desired interface. The L-GW 112 contains miss entries for all the required flow tables for guiding a packet in cases where there is no flow match in a given flow table.

For a given session, the configuration set by the controller 110 in respect of the UE 103 will dictate whether a destination is a local gateway or an Internet host that needs session offload or an Internet host that needs to be reached through the core network. All of the flows that are programmed are validated against rules in the controller 110 and a corresponding Access Control Application constructs a flow (for creating in the flow table) that is inserted through a FLOW MOD message sent from the controller 110 to the switch 113.

The L-GW 112 acts as an open flow switch for SIPTO traffic. In this case, the L-GW 112 creates two flows, one for uplink and one for downlink, in the flow table 114. These two entries guide a packet to the next node. If a packet is received from the Internet, a flow match against the flow table provides the required information concerning which radio service link is to be used for onward transmission to the UE. If a packet is received over the radio interface, a flow match for that packet provides the information concerning over which interface the packet needs to be sent out (e.g., Internet or tunnel). In this case, the L-GW 112 maps the downlink traffic with session/association and uses ERABID/TEID for correlation. This is required for mapping downlink packets for forwarding to the UE 103. If the radio resource is not available (i.e., the UE 102 is in IDLE mode), then the L-GW 112 sends a dummy packet to the S-GW 108 to initiate paging on an L-S5 tunnel. Once the RRC re-establishes the connection, the flow table can be updated to map the UE 103 for the downlink traffic.

Modifying the session for interception is possible for SIPTO traffic. The traffic can be mirrored and directed to the core network for monitoring and auditing of the session in order to take any necessary action on the flow.

Figure 2:
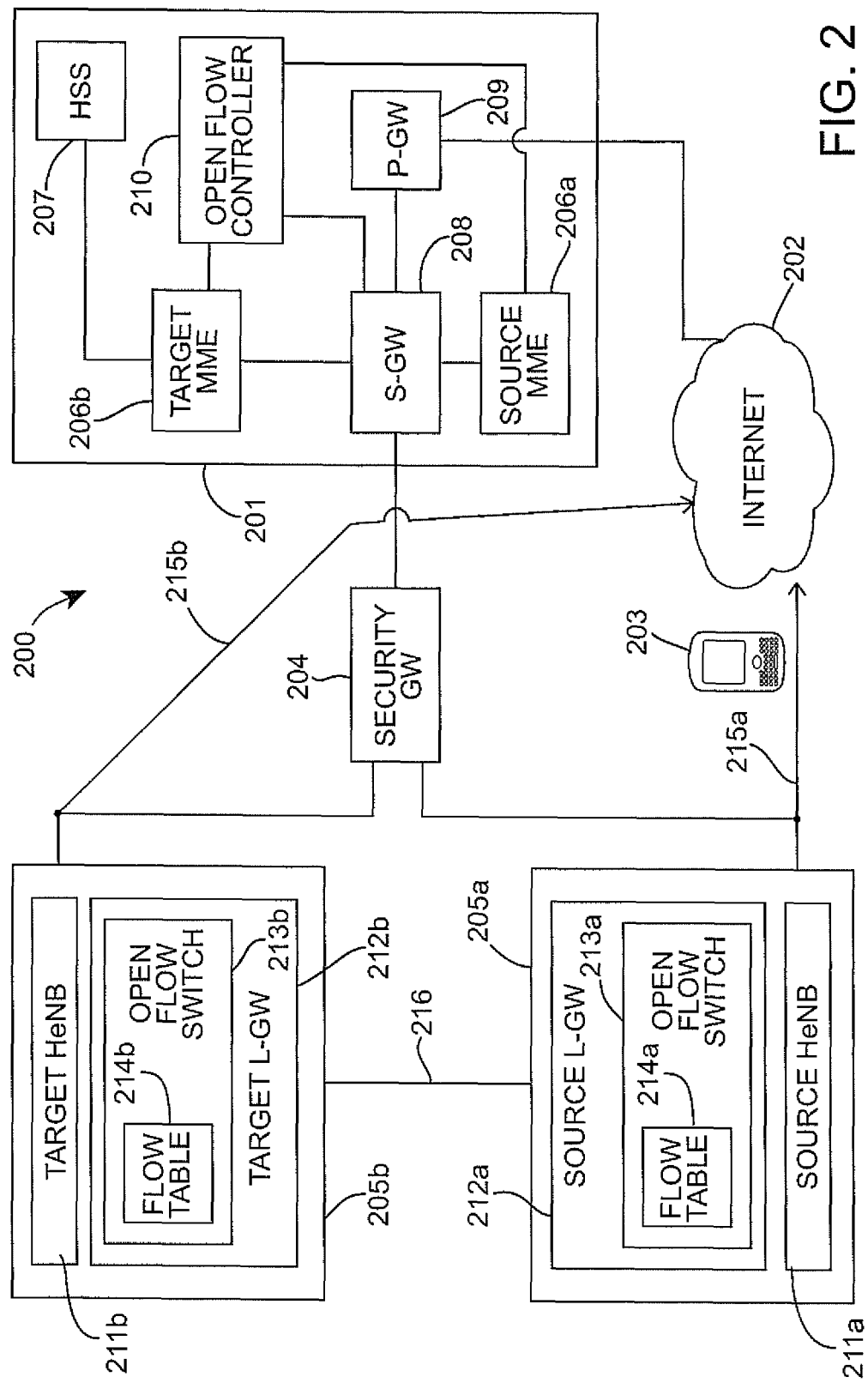
FIG. 2 is a simplified, schematic block diagram of a wireless communications system in accordance with a second embodiment of the invention.

Referring now to FIG. 2, a second example of a wireless network 200 in accordance with the present invention is shown. A Core Network 201 routes traffic between the Internet 202 and a wireless communication unit (User Equipment) 203 via a security gateway (Sec-GW) 204 and one or another of two network elements 205a and 205b. Initially, in one example, the UE 203 is attached to a source network element 205a and is required to handover to a target network element 205b. The Core Network 201 in this example is an Evolved Packet Core and includes a source Mobility Management Enterprise (MME) 206a that is associated with the source network element 205a and a target MME 206b, a Home Subscriber Server (HSS) 207, a Serving Gateway (S-GW) 208 and a Packet Gateway (P-GW) 209. The source MME 206a and the target MME 206b can communicate with one another. In some embodiments, the source and target MMES 206 may be the same entity. An open flow controller 210 is also provided and can communicate with the network elements 205a, 205b via the S-GW 208 and Sec-GW 204. The controller 210 can also communicate with each MME 206. The controller 210 may have the capabilities of the open flow controller 110 described with reference to FIG. 1 and may send modification messages for modifying flow tables included in each of the source and target network elements 205. Each network element 205a, 205b includes the functionality of a Home enode B and a local gateway. In this example, each network element 205a, 205b comprises a Home eNode B (HeNB) 211a, 211b, respectively co-located with a Local Gateway (L-GW) 212a, 212b.

Each L-GW 212a, 212b is provided with (or in some embodiments, may actually comprise) an open flow switch 213a, 213b. Associated with each switch 213a, 213b is a flow table, 214a, 214b, respectively. In some embodiments, more than one flow table in each L-GW 212 is provided. The L-GWs 212a, 212b may operate in a similar fashion to the switch-and-table-based processing methods described with reference to the wireless communication network of FIG. 1. Traffic may be off-loaded from either the source network element 205a or the target network element 205b on lines 215a and 215b respectively. A secure tunnel (IPSec) 216 is established between the source and target network elements 205a, 205b. Such a secure tunnel 216 is, in one embodiment, pre-configured for use in handover situations.

A process for handover of the UE 203 from the source network element 205a to the target network element 205b while maintaining SIPTO continuity will now be described. It will be noted that SIPTO session continuity can be achieved when the source L-GW 212a becomes an anchor for the sessions that support continuity. In order to achieve this, NAT (Network Address Translation) is used at the source network element 205a, i.e., the uplink traffic is "NATed" at the source network element 205a and all the downlink traffic at the source network element 205a is reverse "NATed" in order to send packets back to the originating entity. In one example, packets may be sent back to a UE or in another example, to the target network element by way of the secure tunnel 216.

The invention provides a way of maintaining session continuity during a handover process. Conventional handover initiation and execution processes can be used with the following modifications. During the handover procedure, multiple FLOW-MOD messages are sent from the controller 210 to the source and target network elements 205a and 205b in order to achieve continuity of an active session. The conventional "S1AP Path Switch Request" sent from the target HeNB 211b to the target MME 206b to switch the path from the source HeNB 211a to the target HeNB 211b results in the target MME 206b instructing an Open Flow Controller Application in the controller 210 to configure the necessary flow modifications for the handover. In this embodiment, flows are available in the flow table 214a of the source network element 205a for enabling both uplink and downlink traffic to pass between the UE 203 and the Internet 202. When a handover is initiated at the source network element 205a, a FLOW MOD message is sent from the controller 210, which changes the flow for the downlink traffic in the following manner. Whereas a previous flow would have provided the necessary information for radio processing, after receipt of the FLOW MOD message, all downlink traffic is diverted to the secure IPSec tunnel 216 and thence to the target network element 205b. The FLOW MOD message changes the flow for uplink traffic in the following manner. At the source network element 205a, for uplink traffic, the flow is modified to receive a packet from the secure tunnel 216 and to "de-tunnel" the packet for sending out to a previously configured output interface, e.g., the Internet 202. To achieve this functionality, proprietary vendor extensions can be introduced.

During the handover and once the target network element 205b has accepted the handover, for the active sessions, the controller 210 sends a FLOW MOD message to the target network element 205b in order to create two flow entries (for uplink and downlink traffic). For the downlink traffic, the target network element 205b receives the traffic from the secure tunnel 216 and "de-tunnels" the packets and performs a flow match in the flow table 214b. On matching the flow, the relevant instructions are applied and the associated action is performed in order to send the packet onward for radio processing. For the uplink traffic, once a packet is received over the radio interface, it is matched against the flow table entries. The resulting flow entry guides the packet so that it is sent through the secure tunnel 216 to reach the source network element 205a for sending the packet out to the Internet 202. It should be noted that this procedure is particularly applicable to an active session. New sessions may be processed along the lines described with reference to FIG. 1.

Once the target network element 205b is ready to offer service to the UE 203, the UE 203 needs to synchronize uplink and downlink channels in order to establish Radio Resource with the target network element 205b and re-establish the PDN connection with new network elements. Once the handover command is received from the source MME 206a at the source network element 205a, all subsequent traffic related to the UE 203 will be sent to the target network element 205b, which will buffer the traffic until the UE 203 confirms the handover to the target network element 205b. This buffered data can be transferred sequentially to the UE 203 once the handover is confirmed, and all subsequent packets can be sent directly to the UE 203 without buffering.

The functional components of the network elements may be implemented in one or more integrated circuits. An integrated circuit device may comprise one or more dies in a single package with electronic components provided on the dies that form modules and which are connectable to other components outside the package through suitable connections such as pins of the package and bond wires between the pins and the dies.

In other embodiments, the functionality of the network elements, particularly the open flow switch and flow table management may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors that can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system that may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions).

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing a function within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system elements.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Furthermore, the order of features in the claims does not imply any specific order in which the features must be performed and in particular the order of individual steps in a method claim does not imply that the steps must be performed in this order. Rather, the steps may be performed in any suitable order.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method for communicating data packets between network devices in a wireless communication system, wherein the system comprises an open flow controller and a network element, wherein the network element comprises an open flow switch including at least one flow table, the method comprising:
    at the network element, on receipt of a first data packet from a wireless communication unit, sending the first data packet to the open flow controller in a message that includes an identifier;
    at the open flow controller, processing the first data packet with rules that match the identifier, returning the first data packet to the network element and sending a modification message to the network element for creating a session in a flow table and for programming the open flow switch with the rules for forwarding packets to either a core network or a local network; and
    at the network element, forwarding the first data packet and subsequent packets from the wireless communication unit in accordance with the programmed rules.

2. The method of claim 1, further comprising configuring pro-active flows in the open flow switch.

3. The method of claim 1, further comprising:
    at the network element, receiving a subsequent packet;
    searching for a matching flow in the flow table; and
    if a matching flow is found, performing an associated action defined in the found matching flow on the received subsequent packet.

4. The method of claim 1, wherein said identifier comprises an EUTRAN RAB (radio access bearer) ID.

5. The method of claim 1, wherein the open flow controller sends a further modification message to the network element for mirroring a session to a further network element for interception purposes.

6. The method of claim 5, further comprising forwarding packets back to the network element to ensure session continuity.

7. The method of claim 1, wherein a MME (mobility management entity) configures the open flow controller with mobility information parameters.

8. The method of claim 7, wherein the mobility information parameters include at least one of: whether LIPA or SIPTO can be applied to traffic associated with a particular wireless communication unit; a network element IP address; and a wireless communication unit S1 attach, EURABID, TEID.

9. The method of claim 1, further comprising:
    at the network element, buffering data packets received subsequent to the first packet.

* * * * *